United States Patent [19]

Ribbecke et al.

[11] 4,071,514

[45] Jan. 31, 1978

[54] WATER DISPERSIBLE ALKYD PAINT COMPOSITION

[75] Inventors: Lawrence F. Ribbecke; Chi Chen Shu, both of New York, N.Y.

[73] Assignee: Sapolin Paints, Inc., Danbury, Conn.

[21] Appl. No.: 798,961

[22] Filed: May 20, 1977

[51] Int. Cl.$^2$ ... C09D 3/64; C09D 3/72; C09D 5/02
[52] U.S. Cl. ....... 260/22 M; 260/22 R; 260/22 TN; 260/29.2 E; 260/29.2 UA; 260/29.2 TN
[58] Field of Search ......... 260/22, 22 T, 22 R, 22 TN, 260/22 M, 29.2 E, 29.2 UA, 29.2 TN

[56] References Cited

U.S. PATENT DOCUMENTS

| 2,634,245 | 4/1953 | Arndt | 260/22 R |
|---|---|---|---|
| 3,001,961 | 9/1961 | Armitage et al. | 260.22 T |
| 3,077,459 | 2/1963 | Hershey et al. | 260.22 R |
| 3,297,605 | 1/1967 | Schroeder et al. | 260.22 R |
| 3,310,512 | 3/1967 | Curtice | 260.29.4 R |
| 3,379,548 | 4/1968 | Jen | 260.22 R |
| 3,437,615 | 4/1969 | Hanson | 260.22 R |
| 3,442,835 | 5/1969 | Curtice et al. | 260.22 M |
| 3,442,842 | 5/1969 | Bonin | 260.29.2 UA |
| 3,639,315 | 2/1972 | Rodriguez | 260.22 TN |
| 3,752,778 | 8/1973 | Dhein et al. | 260.22 TN |
| 3,804,787 | 4/1974 | Nicks et al. | 260.22 R |
| 3,920,597 | 11/1975 | Nicks et al. | 260.22 R |
| 4,051,089 | 9/1977 | Tobias et al. | 260/22 R |

Primary Examiner—Ronald W. Griffin
Attorney, Agent or Firm—Marvin Reich

[57] ABSTRACT

Water dispersible alkyd paint compositions and their method of preparation are herein presented.

Alkyd paint compositions or coating polymers containing alkyd resin are made miscible and dilutable with water. It is therefore proposed to provide paint compositions which retain all of the desired properties of alkyd paints, usually known as oil base paints, and in addition to have all of the best properties and qualities of a so-called water based paint. All of these properties in a single paint formulation present a notable advance in the art. In essence, perhaps the most important properties of such a paint composition resides in easy clean-up of application tools, such as paint brushes with detergent and with water.

8 Claims, No Drawings

WATER DISPERSIBLE ALKYD PAINT COMPOSITION

This invention is directed to an alkyd or oil base paint which is water miscible and which has all the combined properties of an oil base paint and a water base paint.

The prior art has shown in the Dhein Patent 3,752,778 that the modification of ordinary alkyd polymers with a wide range of iso-cyanates may be satisfactory in overcoming inherent air drying and stabilizing problems which have heretofore existed with water thinned or diluted alkyd polymers. In Dhein, Pat. No. 3,752,778 the polyglycol is added after the formation of the polymer and as a diluent and/or co-solvent. This is in sharp contrast to the novel innovation of this invention which will be described below:

Nicks Patent 3,804,787 teaches a similar approach in which the polyglycols are actually reacted into one alkyd used in amounts of up to 50 percent of the coating vehicle with a second, nonpolyglycol containing alkyds as the balance. Note that both of these are thinned with mineral spirits as is the remainder of the coating formula. The claimed result of the process is easy clean-up with ordinary household detergent and water.

The present invention is based on the finding that the polyglycols are reacted into the alkyd resin unlike that taught in the Dhein patent. By this technique, the coating polymers of the invention are easily dilutable with water and are miscible. Considering applicant's formula further, it is possible in this invention to use or not use mineral spirits as the thinner before reacting the polyglycols in with the alkyd resins.

By following the general concepts outlined above, applicant has produced novel paint compositions that can be quickly and easily cleaned up as can the tools employed, such as paint brushes, rollers, and the like with available detergents and water. This is a notable advance in that the new compositions are also not combustible whereas the alkyds may be. This is another advance in the art. Another advantage resides in the avoidance of micro-biological degradability during storage in the paint can.

In addition to the foregoing, the new paint formulations of this invention are unaffected by freezing, having a minimum amount of polluting hydrocarbon solvents. They possess excellent adhesion to coated or uncoated substrates. They may be used for exterior purposes since they exhibit durability with respect to non-chalking and gloss retention of up to 3½ years of exposure. Also noteworthy is the lack of loss of compatibility with the pigments employed. These paint formulations have also been shown to have excellent mildew resistance.

The temperature range over which these paints may be applied may be 40 to 45° F. as against a minimum of 55° F. for the usual latex paints. In other words, these paints may be used at lower temperatures and accordingly extend the painting weather season.

With respect to ease of manufacture, the formulations may be processed in standard reaction apparatus.

Having listed the advantages of this invention, it is important to note that the chemical mechanism that is utilized and relied upon in achieving paints having all of the properties already described.

In this invention, it has been found that a chemical mechanism is required such as the formation of a syndet moiety from a conjugated vegetable or animal oil such as linseed, soya, safflower, sunflower, menhaden and the like with dibasic acid anhydrides and a polyglycol.

Generally, the proportions used may range from 0.2 to 0.4 equivalents of the anhydrides and 0.4 to 0.8 equivalents of polyglycol with one equivalent of oil. Polyglycols have been used of from 600 to 1,200 molecular weight (Union Carbide Carbowax Polyglycols are typical examples). The processing temperatures may range from 350° F. to 550° F. All of the compositions have been prepared by solvent process polymer techniques and the end products have typical values such as:

Specific gravity—1.0080–1.05
Viscosity—(Gardner U–$Z_2$)
Acid Value—9–15

In a more specific aspect, one part of a polyglycol based polymer is mixed with from three to four parts of alkyds of the type normally used to formulate protective interior and exterior coatings. Water is employed to thin the mixture to a desirable non-volatile content and the mixture is then treated with standard paint driers at whatever level may be appropriate to the alkyd being used. The resulting vehicle can then be used as a clear or pigmented coating formulation. Long chain and medium chain oil alkyds prepared with the particular oil of interest have been employed in this work as well as alkyds prepared from fatty acids. In addition, certain modifications of the alkyds have been made in which epoxy resin and iso-cyanates have been employed. Also the concepts of this invention have been modified to include the use of pure urethane resins with excellent results.

The unexpected result of the technique herein described is that in no case is the film integrity, clarity, gloss color, drying or durability affected by the inclusion of the polyglycol syndet.

The exact theory of the invention is not known. It is possible that this unexpected result stems from reacting the polyglycol into an oil anhydride molecule in such a manner that the polyglycol entity is neither changed or re-arranged but has become an integral part of the molecular configuration, while at the same time maintaining its hydrophillic characteristics. It can only be assumed that at the same time the oil utilized to form the syndet remains hydrophobic. The syndet seems to function as a stable surfactant or emulsification mechanism with respect to the alkyd/oil/solvent/water mixture. In addition, it is possible to employ in this system more than just a single solvent. For example, co-solvents for the purpose of adjusting the rate of evaporation of the water and/or solvent mixture in the coating formula. To achieve this, use has been made of solvents including methyl carbitol, methyl cellosolve, ethyl cellosolve, isopropanol, butanol, and the like.

The invention and its full scope is described as follows. Please note that the invention comprises two parts and each is described in detail.

PART I

This involves reacting a polyglycol into a drying oil molecule by forming a syndet type moiety. The drying oil may be any unsaturated vegetable, nut, or marine oil such as linseed oil, safflower, soya, sunflower, tung, or menhaden and the like.

Usually the drying oil is reacted with a dibasic acid such a fumaric, maleic, isoconic, citraconic, phthalic, isophthalic, etc.

The reaction is processed in situ and may be ester-interchange, adduct formulation or some combination of both mechanisms.

Drying oils found most suitable are safflower, linseed, or soya. The dibasic acids of choice are fumaric and maleic because of cost and reaction time cost. The polyglycols most suitable are, as mentioned earlier, of the carbowax type having molecular weights ranging from 600 to 1,200.

PART II

This involves using Part I with Part II which can be any conventional solvent thinned processed oil, alkyd, urethanealkyd, or straight urethane in the proportion of 20-25% by weight or volume of Part I and 75-80% of the conventional coating vehicles. The mixture then can be thinned with water to the desired total solids and used as a clear or vehicle for pigmented coatings. The mixtures of Parts I and II as described, can be treated with conventional paint driers and yield continuous films which dry in the same time or less than the solvent thinned coating by itself. Further, these films have all the physical characteristics associated with service and durability of conventional all resin/polymer coatings.

By following the procedure outlined in Parts I and II, the following advantages are obtained:

1. Urethane heretofore required solvent to make and thin for application.
2. Before this, water thinned material was limited in formulating flexibility. Also:
   A—Gloss
   B—Drying
   C—Pigmentation
   D—Compatibility with tinting systems
   E—Stability in package
3. Elimination of hydrocarbon emissions or use of polluting solvents with little or no odor.
4. Apparent inherent mildew resistance based on exposure testing.
5. Not attacked by bacteria in package (as is latex paint).
6. Can be made in normal alkyd reactor equipment using standard control techniques.
7. Equal in cost to latex emulsions.
8. Has unlimited freeze-thaw stability unlike currently manufactured water thin coatings.
9. Will not re-soften in water exposure situations as do conventional latex paints.
10. Can be applied at lower temperatures than latex paint (limited to 55° F. and above) such as 40°-45° F. thus adding to application weather flexibility.

To further illustrate the invention, the following examples are presented in which all parts and percentages are by weight.

EXAMPLE 1

Part I

In the first part of this example, Part I, as described above is set forth:

|  | Parts |
|---|---|
| Linseed oil | 580 |
| Fumaric acid | 60 |
| Polyglycol 600 (Carbowax) | 360 |

The oil is heated to 440° F., in the presence of $CO_2$. Fumaric acid is heated to 460° F. 15 grams of Xylol is added to the reactor. The mixture is heated to 530° F. until it is clear. With heat off, the polyglycol, carbowax 600 is added. The mixture is then heated to 540° F. until the acid value is 10-15, with viscosity Z. Finally, with the heat off, the Xylol is blown off.

Part II

In the preparation of Part II, the following formulation is employed:

|  | Parts |
|---|---|
| Sunflower oil | 835 |
| Pentaerythritaol | 49 |
| Dibutyltinoxide | 67 |
| Toluol | 67 |

This formulation is heated slowly to 370°-380° F. When the mixture is clear, 9 parts of methyl alcohol and 1 part of base are added. Heat is removed and the mixture is cooled to 150° F. 116 parts of toluene di-isocyanate are added and the temperature is controlled at 150°-180° F. Lead napthenate, 25 parts are added. The mixture is heated to 260° to 270° F. and held for W viscosity. Toluol is then blown off. A viscosity of X-4 and color of 7-8 are obtained.

The novel paint compositions are then obtained by reacting Part I into Part II in the manner fully described ahead of the examples.

EXAMPLE 2

Part I of Example 1 is then employed with various paint formulations. Employing the processing technique described in Example 1, a Part II formulation, as follows, was prepared:

Safflower oil 200 is heated to 500° F. Pure pentaerythritol 90, is added and held at 500° F. 45 parts of sodium bicarbonate is added and also held at 500° F. The temperature is dropped to 460° F. When the solution becomes clear in 9 parts of clear methanol and 1 part of base it is cooled to 450° F. and 70 parts of naphtha are added. The mixture is cooled to 150° F. and 210 parts of toluene di-isocyanate are added. The mixture is then heated to 200° F., and held until viscosity X is obtained at 60% solids.

The reactions between Part I and Part II are the same as has already been described.

EXAMPLE 3

Using Part I of Example 1 and repeating the technique above, another Part 2 was prepared in similar manner using:

|  | Parts |
| --- | --- |
| Linseed oil | 664 |
| Pure penta | 111 |
| Phthallic anhydride | 120 |
| Fumaric acid | 10 |
| Mineral spirits | 855 |
| T.D.I. | 95 |

Part I of Example 1 is reacted into the composition obtained from processing the above formula, to again produce the novel paint compositions of this invention.

The coating compositions above produced find utility in many types of coatings such as house and trim paints, floor paints, enamels, varnishes, primers, antifouling coatings, etc. The drying mechanism of the vehicle used is not affected. Water and/or water plus solvent evaporates from the coating in a normal manner. The remaining film formed solids proceed to dry by normal drier catalytic action exactly as the conventional solvent thinned material would.

We claim:

1. A method of producing miscible and water dilutable alkyd coating polymers which comprises forming an alkyd moiety by reacting a conjugated oil selected from the group consisting of linseed oil, soya oil, safflower oil, sunflower oil and menhaden oil, a dibasic acid anhydride and a polyglycol of molecular weight 600 to 1,200, whereby a miscible and water dilutable alkyd coating polymer is produced, the proportions employed being from 0.2 to 0.4 equivalents of anhydride and 0.4 to 0.8 equivalents of said polyglcol per one equivalent of oil, said method including process temperatures ranging from 350° F. to 550° F.

2. An air-drying miscible and water dispersible coating composition produced by the process of claim 1.

3. The method of claim 1 employing fumaric acid.

4. The method of claim 1 employing maleic acid.

5. The method of claim 1 in which the oil is linseed oil.

6. The method of claim 1 in which the oil is safflower oil.

7. The method of claim 1 employing a diisocyanate.

8. The method of claim 7 wherein the diisocyanate is toluene diisocyanate.

* * * * *